Dec. 24, 1968  V. H. HAASE ET AL  3,417,638
ROAD SPEED DRIVE MECHANISM FOR SELF-PROPELLED
CONCRETE SAWS AND THE LIKE
Filed July 24, 1967  2 Sheets-Sheet 1

INVENTORS.
VICTOR H. HAASE
& JOHN R. HARCLERODE
BY
*Fishburn, Gold and Litman*
ATTORNEYS Dec. 24, 1968  V. H. HAASE ET AL  3,417,638
ROAD SPEED DRIVE MECHANISM FOR SELF-PROPELLED
CONCRETE SAWS AND THE LIKE
Filed July 24, 1967  2 Sheets-Sheet 2

INVENTORS.
VICTOR H. HAASE
& JOHN R. HARCLERODE
BY
*Fishburn, Gold and Litman*
ATTORNEYS United States Patent Office 3,417,638
Patented Dec. 24, 1968

3,417,638
ROAD SPEED DRIVE MECHANISM FOR SELF-PROPELLED CONCRETE SAWS AND THE LIKE
Victor H. Haase and John R. Harclerode, Kansas City, Mo., assignors to Robert G. Evans Company, Kansas City, Mo., a corporation of Missouri
Filed July 24, 1967, Ser. No. 655,618
10 Claims. (Cl. 74—720)

ABSTRACT OF THE DISCLOSURE

A drive mechanism for self-propelled concrete saws utilizes a rocking bracket to selectively engage and disengage a drive connection to a prime mover and a platform hinged for rocking on the bracket for selectively engaging and disengaging alternate drive means operative through a hydraulic motor driven by a pump which is in turn powered by the prime mover.

---

This invention relates to drive mechanisms and more particularly, to drive mechanisms for self-propelled apparatus, such as concrete pavement saws, which are normally operated at a very slow ground speed, but, for efficiency, must be moved at a relatively high ground speed to a new location of operation.

Heretofore, apparatus such as self-propelled concrete saws, included mechanisms for selectively connecting the prime mover to ground contacting driving wheels through a suitable transmission for causing the apparatus to move at the desired cutting speed. When it became necessary to move the apparatus to a distant location, however, the prime mover was normally disconnected and the apparatus pushed or pulled by hand to the new location or transported by means of a suitable truck. Although mechanisms which permitted a selective high or low drive speed have been suggested for such apparatus, such mechanisms heretofore have generally been complex, expensive, difficult to use and often unreliable.

The principal objects of the present invention are: to provide a drive mechanism for self-propelled concrete saws and the like which permits easy shifting from a low cutting speed to a relatively high road speed; to provide such apparatus which includes an interlock preventing interference between two power transmission trains; to provide such apparatus which is simple and inexpensive in construction; and to provide such apparatus which is reliable and long lived in use.

Other objects and advantages of this invention will become apparent from the following description taken in connection with the accompanying drawings wherein are set forth by way of illustration and example certain embodiments of this invention.

Figure 1:
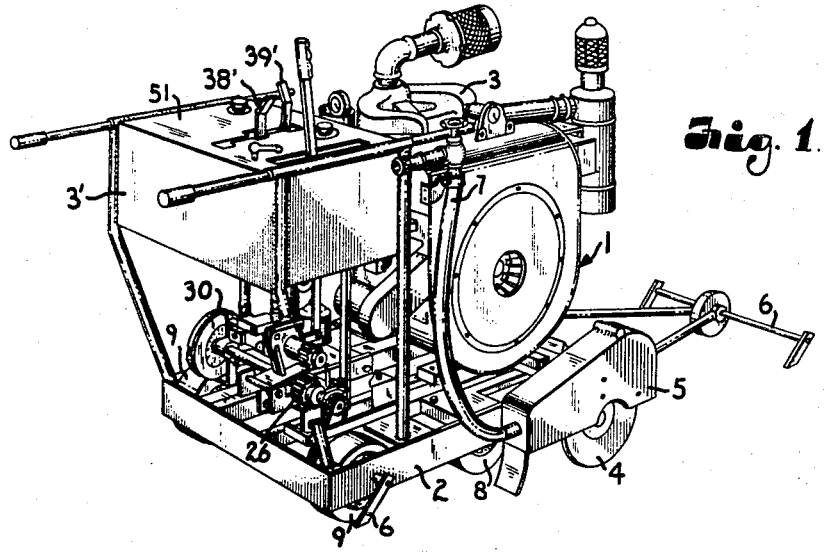
FIG. 1 is a perspective view of a self-propelled concrete saw embodying the drive mechanism of this invention.

Referring to the drawings in more detail:

The reference numeral 1 generally indicates a self-propelled concrete saw having a frame 2 supporting a prime mover 3 in the form of an internal combustion engine. The engine 3 obtains fuel from a tank 3 and, through a known power train (not shown), selectively drives a cutting blade 4 which rotates partially within a hood 5. Guide members 6 are used to help maintain a straight line of cut during operation of the saw. A coolant, such as water, is normally directed through a hose 7 against the blade 4 to prevent overheating and subsequent destruction thereof. A pump 7' may be used to aid water flow if desired.

The concrete saw 1 is moveably supported on the ground by idling front wheels 8 and driven rear wheels 9. The rear wheels 9 are supported on and driven through a shaft 10 rotatably mounted on the frame 2 and having a sprocket 11 fixed thereon and engaged with a drive chain 12.

A hydraulic pump 13 is mounted on the frame 2 by means of a suitable bracket 14 and a drive belt 15 connects the input pulley 16 to the prime mover whereby the pump 13 is powered during operation of the prime mover. A pump 13 is connected by means of hoses 17 to a hydraulic motor 18 having an output spur gear 19 which rotates in response to the circulation of hydraulic fluid through the hoses 17 between the pump 13 and the motor 18. The hoses 17 are resilient, permitting the hydraulic motor 18 to be moved with respect to the pump 13 during operation for a purpose described below.

A mounting bracket 20 is pivotally connected to the frame 2 by means of suitable bolts 21 for rocking movement through a relatively small angle 22 generally circumferentially about the wheel driving shaft 10. A jack shaft 23 is rotatably supported on the mounting bracket 20 and extends generally parallel to but spaced from the wheel drive shaft 10 for reasons to be discussed.

Figure 3:
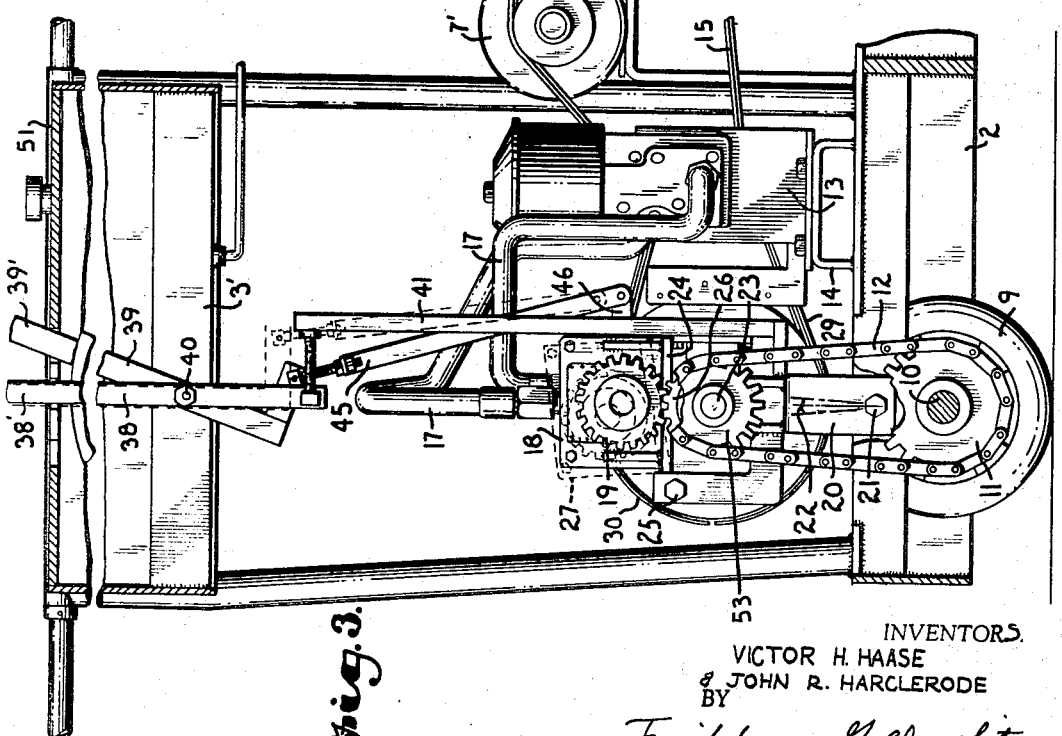
FIG. 3 is a fragmentary side elevation on an enlarged scale of the concrete saw particularly showing control levers.

A platform 24 is hinged by means of a suitable pin 25 to the mounting bracket 20 for rocking movement generally vertically toward and away from the jack shaft 23. A spur gear 26 is rotatably fixed on the jack shaft 23 intermediate the ends thereof. The hydraulic motor 18 is rigidly mounted on the platform 24 and is positioned whereby the motor spur gear 19 and jack shaft spur gear 26 are correspondingly engaged and disengaged upon the rocking of the platform 24 toward and away from the jack shaft 23 as illustrated by the broken lines at 27, FIG. 3.

A pulley 28 is fixed near one end of the jack shaft and a drive belt 29 extends therearound. The drive belt 29, even when slack, is maintained in close association with the pulley 28 by means of pulley guards 30 which are suitably secured to the mounting bracket 20. Thus, the belt 29 is maintained in a ready position to be engaged by the pulley 28 even when slippage is permitted therebetween. The drive belt 29 also partially surrounds a pulley 31 which rotates with the pulley 26, the latter driving the drive shaft 32 of the pump 13. A pulley guard 33 functions like the guard 30 to maintain the drive belt 29 in ready position for engagement with the pulley 31 when tightened.

Figure 4:
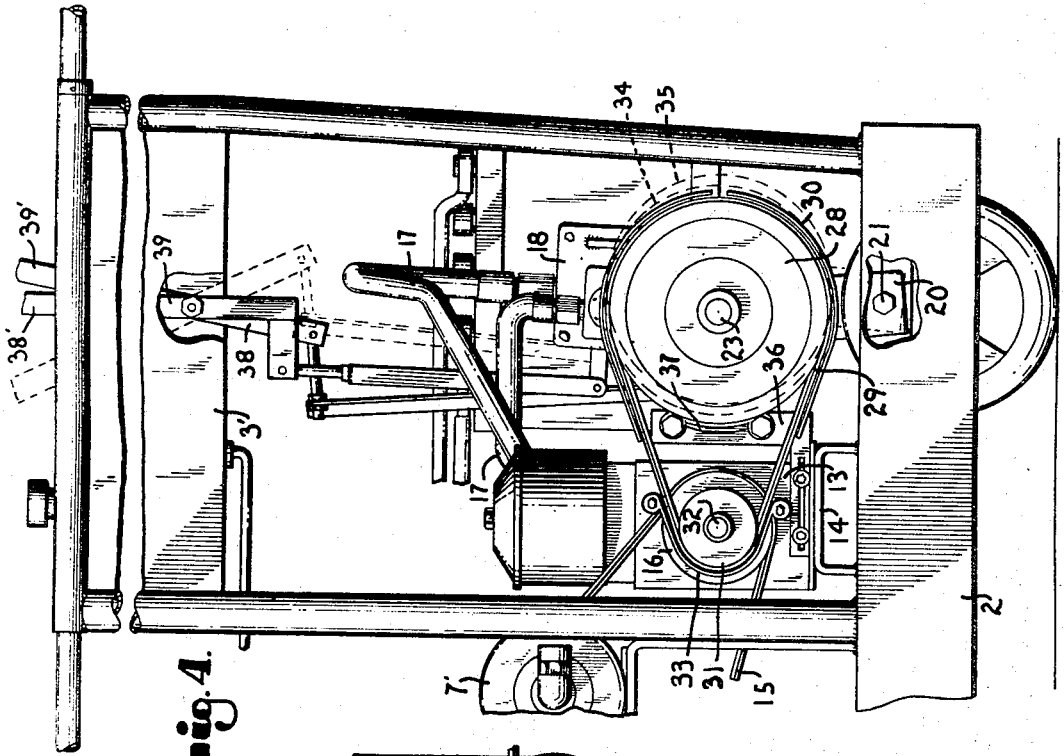
FIG. 4 is a fragmentary side elevation of the concrete saw taken from the side opposite to that of FIG. 3.

When the mounting bracket 20 is rocked toward the rear of the apparatus 1, the pulley 28 is moved through subsequent positions indicated by broken lines 34 and 35 from the positions shown in solid lines (FIG. 4). When the pulley 28 is in the position 35, the drive belt 29 is taut whereupon the rotation of the pulley 16, by means of a drive belt 15 connected to the prime mover, produces rotation of the pulley 28. When however, the pulley 28 is rocked with the mounting bracket 20 to positions indicated either by the broken lines 34 or the position indicated by solid lines (FIG. 4) the pulley 28 is free to slip with respect to the pulley 31.

A bracket 36 extends upwardly from the bracket 14 and carries a brake lining material 37 thereon located to contact the periphery of the pulley 28 when the pulley is rocked to the position indicated by the full lines in FIG. 4. Thus when the pulley 28 is in the position shown by full lines it will not turn due to engagement with the brake lining material 37. In the central position, however (broken lines 34), the pulley 28 is neither driven by the drive belt 29 nor braked, and is thus free to rotate.

Figure 5:
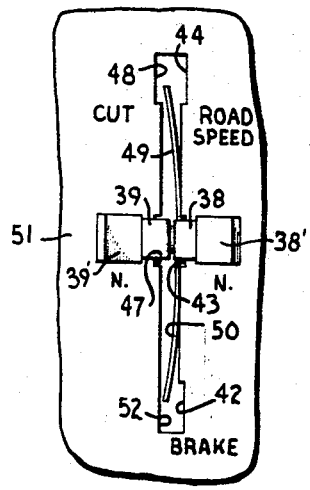
FIG. 5 is a fragmentary plan view showing control lever handles and guides therefor by which the drive mechanism is controlled.
Figure 2:
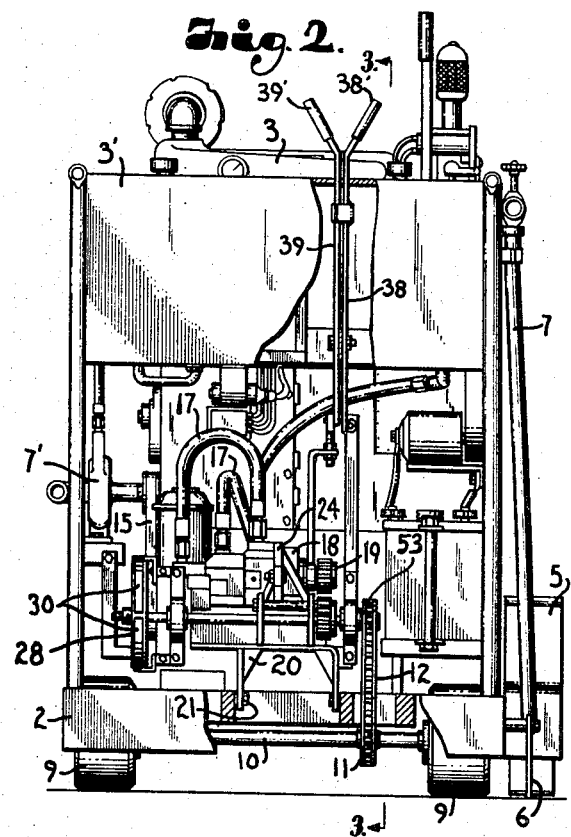
FIG. 2 is an end elevation of the concrete saw showing additional details of the drive mechanism.

Control levers respectively designated 38 and 39 are pivotally connected at 40 with respect to the frame 2 generally above the gears 19 and 26. The control lever 38 is connected to an arm 41 which, in turn, is rigidly connected to the mounting bracket 20 whereby moving the control lever 38 to a position 42 (FIG. 5) urges the pulley 28 against the brake lining material 37. When the control lever 38 is moved to the position 43 (FIG. 5) the mounting bracket 20 is moved to a position whereby the pulley 28 is in "neutral" that is, neither tight against the belt 29 nor engaging the brake lining material 37. When the control lever 38 is in the most forward position 44 (FIG. 5) the pulley 28 is moved to the position indicated by the broken lines 35 whereupon the pulley 28 is driven by the prime mover through the pulley 31.

The control lever 39 is pivotally connected to one end of a link 45 which is pivotally connected at the other end through a projection 46 to the platform 24. When the control lever 39 is moved to the position 47 (FIG. 5) the platform 24 is pivotally raised with respect to the mounting bracket 20 whereupon the spur gears 19 and 26 are disengaged. However, when the control lever 39 is moved to the position 48, the platform 24 is rocked downwardly whereupon the spur gears engage and the jack shaft 23 is driven by the hydraulic motor 18.

Cross-bar extensions 49 and 50 are fixed to the control lever 38 just beneath the top wall 51 through which the control levers extend and form handles 38' and 39' for grasping. The various control lever positions described above are produced within an elongated slot 52 in the top wall 51. The slot 52 has notches therein for laterally receiving the respective control levers and defining the respective control positions. When the control lever 38 is placed in the position 42, the extension 49 contacts the control lever 39, preventing the control lever 39 from being moved out of the neutral position 47. When the control lever 38 is in the position 44 the extension 50 performs the same function. Likewise when the control lever 39 is in the position 48, the pressure exerted by the control lever 39 against the extension 49 prevents the control lever 38 from moving out of the position 43. Thus, an interlock is provided permitting the jack shaft 23 to be driven only by the pulley 28 or the spur gear 26 and there can be no interference therebetween.

A sprocket 53 is mounted on the jack shaft 23 at the end opposite the pulley 28 and is engaged with the drive chain 12 whereby the rotation of the jack shaft 23 drives the wheels 29 of the apparatus. Since the mounting bracket 20 pivots generally circumferentially about the wheel drive shaft 10 there is no appreciable slackening or tightening of the drive chain 12 upon rocking the mounting bracket 20 through the small angle 22 to produce a braking, neutral or driving position of the pulley 28.

By manipulating the control levers 38 and 29 the wheels 9 are driven either at relatively high speed directly from the prime mover through the belts 15, 29 and pulley 28, or relatively slowly (cutting speed) indirectly through the hydraulic pump 13, hydraulic motor 18 and spur gears 19 and 26.

Although one form of this invention has been illustrated and described it is not to be limited thereto except insofar as such limitations are included in the following claims.

What we claim and desire to secure by Letters Patent is:

1. A drive mechanism for apparatus having a frame supporting a prime mover and a driving shaft, said mechanism comprising:
   (a) power transmission means on said frame and having an input and output portion, said input portion being operatively connected to said prime mover, said output portion having an output gear driven by said prime mover through said input portion,
   (b) a mounting bracket connected to said frame for rocking movement in opposite directions generally circumferentially about said driving shaft, a jack shaft rotatably supported on said mounting bracket,
   (c) a platform member hinged to said mounting bracket for rocking movement in opposite directions relative to said jack shaft, a gear rotatably fixed on said jack shaft, said output portion being mounted on said platform member and positioned whereby said output gear and jack shaft gear are correspondingly engaged and disengaged upon rocking said platform member in said opposite directions,
   (d) a drive member on said jack shaft, drive means operatively engaged between said drive member and said prime mover when said mounting bracket is rocked in one of said directions and inoperable when said mounting bracket is rocked in the opposite direction,
   (e) control means for independently rocking said mounting bracket and platform, and drive means between said driving shaft and said jack shaft,
   (f) whereby said driving shaft is selectively driven from said prime mover through said drive member and said power transmission means.

2. The drive mechanism as set forth in claim 1 wherein:
   (a) said power transmission means input portion comprises a hydraulic pump and said power transmission means output portion comprises a hydraulic motor.

3. The drive mechanism as set forth in claim 1 wherein:
   (a) said jack shaft extends generally parallel to said driving shaft and is spaced therefrom.

4. The drive mechanism as set forth in claim 3 wherein:
   (a) said platform member is hinged to said mounting bracket for rocking movement toward and away from said jack shaft.

5. The drive mechanism as set forth in claim 1 wherein:
   (a) said drive member on said jack shaft is a pulley and said drive means between said drive member and prime mover is a drive belt which becomes inoperatively slack when said mounting bracket is rocked in the opposite direction.

6. The drive mechanism as set forth in claim 1 wherein:
   (a) said control means include interlocking members operatively associated therewith preventing the simultaneous engagement of said gears with operative engagement between said drive means and prime mover.

7. The drive mechanism as set forth in claim 6 wherein said frame has a wall and:
   (a) said control means are levers pivoted to said frame and having handles extending through an elongated slot in said wall,
   (b) said interlocking members including spaced lever receiving notches in said slot defining control positions for said levers and an extension on at least one of said levers and positioned to prevent the other lever from moving out of a selected notch until said one lever is in a predetermined notch.

8. The drive mechanism as set forth in claim 1 including:
   (a) brake means fixed to said jack shaft and rotating therewith, and
   (b) a brake member fixed with respect to said frame and in a position to engage said brake means upon rocking said mounting bracket in the direction rendering said drive member inoperative.

9. The drive mechanism as set forth in claim 1 wherein:
   (a) said drive means between said driving shaft and said jack shaft include sprockets respectively on said driving shaft and said jack shaft and a drive chain engaged with said sprockets.

10. A drive mechanism for apparatus having a frame supporting a prime mover and a wheel driving shaft, said mechanism comprising:

(a) power transmission means on said frame and having an input and output portion, said input portion being operatively connected to said prime mover, said output portion having output means driven by said prime mover through said input portion, (b) a bracket moveably connected to said frame for movement in opposite directions, a jack shaft rotatably supported on said bracket, (c) a platform member moveably mounted with respect to said mounting bracket for movement in opposite directions, drive means rotatably fixed on said jack shaft, said output portion being mounted on said platform member and positioned whereby said output means and jack shaft drive means are correspondingly engaged and disengaged upon moving said platform member in opposite directions, (d) a drive member on said jack shaft, drive means operatively engaged between said drive member and said prime mover when said bracket is moved in one direction and inoperative when said bracket is moved in the opposite direction, (e) control means for independently moving said bracket and platform, and drive means between said wheel driving shaft and said jack shaft, (f) whereby said wheel driving shaft is selectively driven from said prime mover through said drive member and said power transmission means.

References Cited

UNITED STATES PATENTS

| | | | |
|---|---|---|---|
| 3,141,702 | 7/1964 | Barton | 299—39 |
| 3,266,846 | 8/1966 | Luksch et al. | 299—39 |
| 3,333,897 | 8/1967 | Rhodes | 299—39 |

DONLEY J. STOCKING, *Primary Examiner.*

L. H. GERIN, *Assistant Examiner.*

U.S. Cl. X.R.

74—405, 411.5, 722, 730; 299—39